C. L. THOMAS.
AUXILIARY SPRING.
APPLICATION FILED MAR. 17, 1909.
947,167.
Patented Jan. 18, 1910.
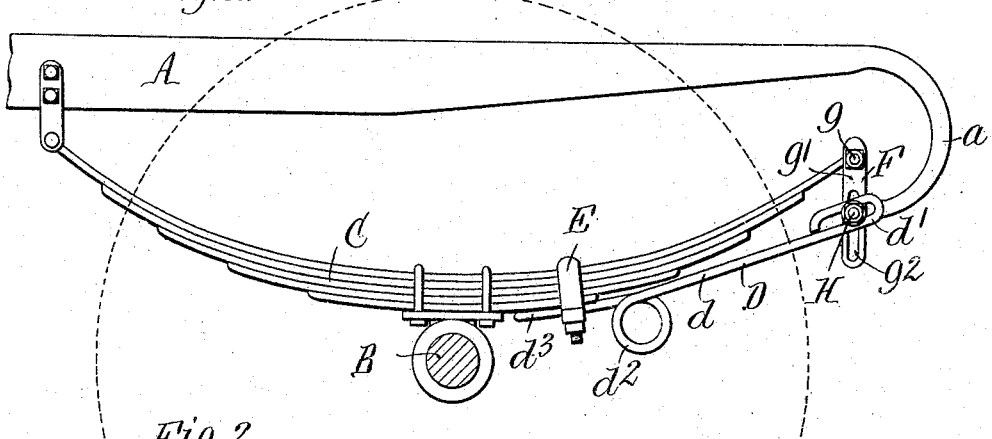
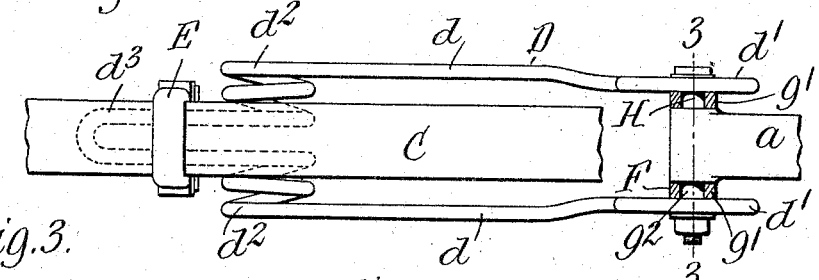
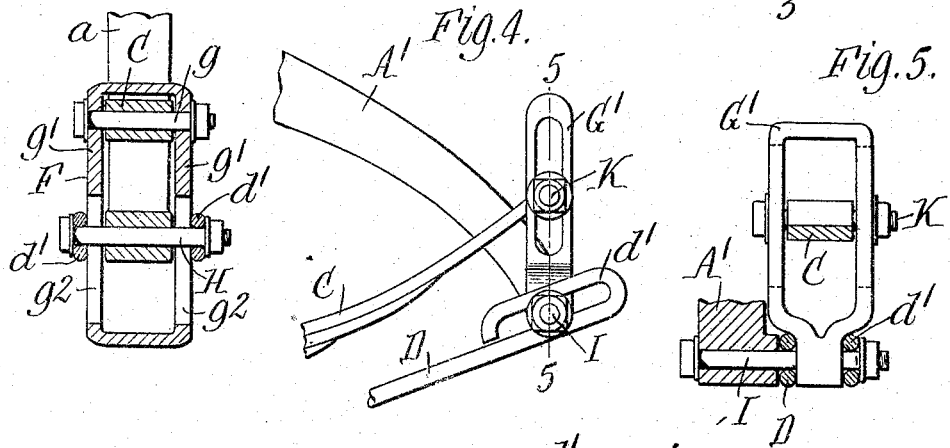
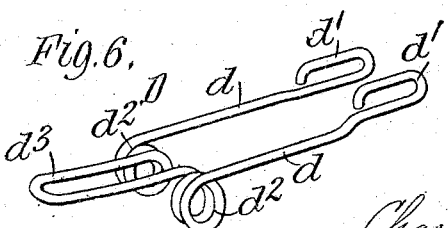
Witnesses
E. A. Volk.
A. G. Dimond
Inventor
Charles Lee Thomas,
by Wilhelm, Parker & Hard,
Attorneys.

UNITED STATES PATENT OFFICE.

CHARLES LEE THOMAS, OF BUFFALO, NEW YORK.

AUXILIARY SPRING.

947,167.  Specification of Letters Patent.  Patented Jan. 18, 1910.

Application filed March 17, 1909. Serial No. 483,889.

*To all whom it may concern:*

Be it known that I, CHARLES LEE THOMAS, a citizen of the United States, residing at Buffalo, in the county of Erie and State of New York, have invented a new and useful Improvement in Auxiliary Springs, of which the following is a specification.

This invention relates to improvements in auxiliary springs which are used in connection with the usual supporting springs of vehicles for the purpose of forming a steady and easy riding spring support for the vehicle body.

One object of this invention is to provide an auxiliary spring of simple construction which can readily be connected with the main spring and the vehicle frame, and which will serve to normally carry the weight of the vehicle body independently of the main spring during a portion of its movement, while in its further movement the auxiliary spring will be assisted and reinforced in its action by the main spring.

A further object of the invention is to construct an auxiliary spring which, while having a certain amount of movement independently of the main spring, will retain its position relative to the main spring and the vehicle frame and will not be distorted or thrown out of position in its movement and will thus hold the body of the vehicle steady and prevent it from swaying or tilting sidewise.

In the accompanying drawing: Figure 1 is a fragmentary side elevation of a vehicle frame and spring equipped with an auxiliary spring embodying the invention. Fig. 2 is a fragmentary plan view thereof partly in section, on an enlarged scale. Fig. 3 is a transverse sectional elevation in line 3—3, Fig. 2. Fig. 4 is a fragmentary side elevation of a modified construction of the frame and connection for the main and auxiliary springs. Fig. 5 is a transverse sectional elevation thereof, on an enlarged scale, in line 5—5, Fig. 4. Fig. 6 is a perspective view of the auxiliary spring detached.

Like reference characters refer to like parts in the several figures.

A represents a portion of one of the side bars of the frame of the vehicle, B the axle and C one of the main supporting leaf springs, all of which parts may be of any suitable and usual construction. In Figs. 1–3 the frame bar A extends above the spring in the vertical plane thereof and terminates in a downturned or hooked end portion $a$ which is commonly known as a "goose neck", while in Figs. 4 and 5 the frame bar A′ is located at one side of the vertical plane of the spring.

D represents an auxiliary spring which is preferably secured at its inner end to the body of the main spring and is connected at its outer end with the ends of the main spring and the frame bar A. It is preferably formed from a single piece of suitable spring material and comprises substantially parallel spaced spring arms $d$ $d$ which terminate at their outer ends in elongated loops $d'$ $d'$ and are provided at their inner ends with vertical coils $d^2$ $d^2$ which are joined by a looped inner end portion $d^3$. The end portion $d^3$ is secured to the spring C near its central connection with the axle by a clamp E of any suitable construction, which embraces the leaves of the main spring and clamps the same and the end portion $d^3$ firmly together. This clamp serves to hold the leaves of the main spring from movement relative to one another for a portion of the length of the spring and thus greatly stiffens the main spring.

For connecting the outer looped ends $d'$ $d'$ of the auxiliary spring with the ends of the frame and main spring, in the construction shown in Figs. 1–3, the following means are employed:

A hanger F embraces the end of the main spring C to which it is secured by a bolt $g$, and has depending arms or side portions $g'$, which straddle the end of the goose neck $a$ preferably between the same and the loops $d'$ $d'$ of the auxiliary spring, and are provided with vertical slots $g^2$ through which and through the eye of the goose neck $a$ passes a bolt H which is secured at its ends in the loops $d'$ $d'$. The bolt H is free to slide vertically in the slots $g^2$ and horizontally in the loops $d'$ $d'$ of the auxiliary spring. This permits the end of the vehicle frame bar and the auxiliary spring with which it is connected to move vertically the length of the slots $g^2$ independently of the main spring.

In Figs. 4 and 5 is shown a modified construction adapting the auxiliary spring to a vehicle in which the frame bar is located at one side of the vertical plane of the main spring. A hanger G′ is employed which is pivotally mounted at its lower end, between the end loops of the auxiliary spring, upon a bolt I which extends out laterally from the end of the vehicle frame bar A'. The hanger has spaced side portions which extend upwardly and embrace the end of the main spring to which they are secured by a bolt K passing through vertical slots in such side portions.
In both constructions the weight of the vehicle body is normally carried by the auxiliary spring, and this spring is free to move independently of the main spring a distance equal to the length of the slots in the hanger, but any further movement in either direction will be communicated by the hanger to the end of the main spring which will oppose the same, thus preventing undue movement of the body. The auxiliary spring is adequate to support the normal load of the body, but is lighter than the main spring and gives an easier movement to the body. The auxiliary spring to a large extent relieves the main spring of the constant wear and strain caused by the weight of the vehicle body resting thereon and thus serves to greatly lengthen the life of the main spring.

The auxiliary spring is so constructed that it can be readily secured to and detached from the main spring and frame of vehicles of the common type of construction without changing the parts thereof, and whenever, for any reason, it becomes necessary to substitute a new auxiliary spring, this can be easily done without disturbing the main spring.

Ordinarily two auxiliary springs are used upon a vehicle, one being applied to the rear end of each of the rear springs, but, if desired, a greater number may be employed which may be applied to either or both ends of the rear springs and to the rear ends of the front springs.
As the auxiliary spring with its coils is rigidly secured to the main spring near the attachment of the latter to the axle, there is no tendency of the auxiliary spring to twist or swing sidewise, permitting the vehicle body to sway or tilt. If desired, the inner end of the auxiliary spring could be secured to the axle or running gear of the vehicle instead of to the main spring, but such construction is not as desirable, as the springs are then not so easily detachable and do not serve to stiffen the main spring.

I claim as my invention:

1. The combination with the main spring of a vehicle, of an auxiliary spring which is lighter than the main spring and is rigidly secured at one end, a frame which is normally supported by the free end of said auxiliary spring, and a lost motion connection between the free end of said auxiliary spring and the free end of said main spring for causing the main spring to supplement the action of the auxiliary spring after the initial movement of the frame, substantially as set forth.

2. The combination with the main spring of a vehicle, of an auxiliary spring having vertical coils between its ends and being rigidly secured at one end, a frame which is normally supported by the free end of said auxiliary spring, and a lost motion connection between the free end of said auxiliary spring and the free end of said main spring for causing the main spring to supplement the action of the auxiliary spring after the initial movement of the frame, substantially as set forth.

3. The combination with the main spring of a vehicle, of an auxiliary spring which is lighter than the main spring and is rigidly secured at one end to the main spring at a distance from the free end thereof, a frame which is normally supported by the free end of said auxiliary spring, and a lost motion connection between the free end of said auxiliary spring and the free end of said main spring for causing the main spring to supplement the action of the auxiliary spring after the initial movement of the frame, substantially as set forth.

4. The combination with the main spring of a vehicle, of an auxiliary spring having vertical coils between its ends and being rigidly secured at one end to the main spring at distance from the free end thereof, a frame which is normally supported by the free end of said auxiliary spring, and a lost motion connection between the free end of said auxiliary spring and the free end of said main spring for causing the main spring to supplement the action of the auxiliary spring after the initial movement of the frame, substantially as set forth.

5. The combination with the frame and main spring of a vehicle, of an auxiliary spring having vertical coils between its ends, means for rigidly securing one end of said auxiliary spring to the main spring at a distance from the free end thereof, means for securing the other end of said auxiliary spring to the vehicle frame, and means connecting the free end of the auxiliary spring with the free end of the main spring which allow the frame to move independently of the latter, substantially as set forth.

6. The combination with the frame and main spring of a vehicle, of an auxiliary spring having vertical coils between its ends, means for rigidly securing one end of said auxiliary spring to the main spring at a distance from the free end thereof, means for securing the other end of said auxiliary spring to the vehicle frame, and means connecting said frame and said auxiliary spring with the free end of the main spring which allow said frame and auxiliary spring to move independently of said main spring, substantially as set forth.

7. The combination with the main spring of a vehicle, of an auxiliary spring having vertical coils between its ends which is rigidly secured at one end to the main spring at a distance from the free end thereof, a frame which is normally supported by the free end of said auxiliary spring, and a device which is connected with one of said springs and has a sliding connection with the other spring for causing the main spring to supplement the action of the auxiliary spring after the initial movement of the frame, substantially as set forth.

Witness my hand, this 10th day of March, 1909.

CHARLES LEE THOMAS.

Witnesses:
E. C. HURD,
C. B. HORNBECK.